US009736286B2

(12) United States Patent
Kennedy et al.

(10) Patent No.: US 9,736,286 B2
(45) Date of Patent: Aug. 15, 2017

(54) METHOD AND APPARATUS FOR QUICK SELECTION FROM ORDERED LIST

(75) Inventors: Ian Kennedy, Helsinki (FI); Teemu Johannes Mikkonen, Oulu (FI); Jarno Tapio Väyrynen, Kemple (FI); Katja Kristiina Kytökorpi, Oulu (FI); Jörg Land, Hamburg (DE); Caitlin Winner, Cambridge, MA (US)

(73) Assignee: HERE GLOBAL B.V., Veldhoven (NL)

( * ) Notice: Subject to any disclaimer, the term of this patent is extended or adjusted under 35 U.S.C. 154(b) by 927 days.

(21) Appl. No.: 12/645,025

(22) Filed: Dec. 22, 2009

(65) Prior Publication Data

US 2011/0154259 A1    Jun. 23, 2011

(51) Int. Cl.
G06F 3/00      (2006.01)
H04M 1/2745    (2006.01)
G06F 3/0482    (2013.01)
G06F 3/01      (2006.01)

(52) U.S. Cl.
CPC .... H04M 1/274583 (2013.01); G06F 3/0482 (2013.01)

(58) Field of Classification Search
USPC ......................................... 715/811, 830, 864
See application file for complete search history.

(56) References Cited

U.S. PATENT DOCUMENTS

| 6,271,835 | B1 | 8/2001 | Hoeksma |
| 7,133,859 | B1 | 11/2006 | Wong |
| 2003/0142147 | A1 | 7/2003 | Chen et al. |

(Continued)

FOREIGN PATENT DOCUMENTS

| CN | 1764892 A | 4/2006 |
| CN | 1975735 A | 6/2007 |

(Continued)

OTHER PUBLICATIONS

International search report and written opinion for corresponding international application No. PCT/FI2010/050844 dated Mar. 3, 2011, pp. 1-12.

(Continued)

*Primary Examiner* — Toan Vu
(74) *Attorney, Agent, or Firm* — Ditthavong & Steiner, P.C.

(57) ABSTRACT

Techniques for quick selection from an ordered list include dividing all items in the ordered list into current groups. Each current group includes a different range of the items. A corresponding plurality of icons for the plurality of current groups is presented substantively simultaneously on a display screen. One corresponding icon for each current group indicates a range of items included in the current group. In response to receiving input that indicates a particular icon corresponding to a particular group of the plurality of current groups, all items included in the particular group are divided into a plurality of next current groups. Each next current group includes a different range of the items included in the particular group. The next current group replaces the previous current group; thus, a corresponding plurality of icons for the plurality of next current groups is presented substantively simultaneously on the display screen.

18 Claims, 9 Drawing Sheets

(56) References Cited

U.S. PATENT DOCUMENTS

| | | | |
|---|---|---|---|
| 2007/0064682 A1* | 3/2007 | Adams et al. | 370/352 |
| 2007/0136286 A1 | 6/2007 | Webster et al. | |
| 2007/0186183 A1 | 8/2007 | Hudson, Jr. | |
| 2008/0092063 A1* | 4/2008 | Canfield et al. | 715/753 |
| 2008/0132285 A1* | 6/2008 | Kwak et al. | 455/566 |
| 2008/0229233 A1* | 9/2008 | Blattner | 715/781 |
| 2008/0235617 A1 | 9/2008 | Kim et al. | |
| 2008/0282179 A1* | 11/2008 | Kim et al. | 715/769 |
| 2009/0177381 A1* | 7/2009 | Taniguchi et al. | 701/208 |
| 2009/0193351 A1* | 7/2009 | Lee et al. | 715/769 |
| 2009/0207139 A1 | 8/2009 | Kraft | |
| 2009/0221322 A1* | 9/2009 | Yach | 455/552.1 |
| 2009/0249235 A1* | 10/2009 | Kim et al. | 715/765 |
| 2010/0064141 A1* | 3/2010 | Manasse et al. | 713/177 |
| 2010/0156815 A1* | 6/2010 | Silberman et al. | 345/173 |
| 2011/0300913 A1* | 12/2011 | Kwak et al. | 455/566 |
| 2012/0010995 A1* | 1/2012 | Skirpa et al. | 705/14.49 |
| 2012/0087430 A1* | 4/2012 | Forenza et al. | 375/267 |
| 2012/0270608 A1* | 10/2012 | Tanabe | 455/566 |
| 2014/0033118 A1* | 1/2014 | Baird | 715/800 |

FOREIGN PATENT DOCUMENTS

| | | |
|---|---|---|
| EP | 1 348 158 B1 | 9/2004 |
| JP | 8-274959 A | 10/1996 |
| WO | WO 2008/080192 A1 | 7/2008 |

OTHER PUBLICATIONS

Hallow Demon Friendz. Accessed: Mar. 23, 2010, http://hallowdemonlive.com/.

Chinese Office Action for related Chinese Application No. 201080058595.6, dated Apr. 28, 2014, with English-language summary, 12 pages.

Chinese Office Action corresponding to Chinese Patent Application No. 201080058595.6, dated Jan. 7, 2015, with English-language summary; 4 pages.

Office Action for corresponding European Patent Application No. 10838733.3-1959, dated Jan. 14, 2016, 8 Pages.

\* cited by examiner

METHOD AND APPARATUS FOR QUICK SELECTION FROM ORDERED LIST

BACKGROUND

On hand-held information processing devices, such as personal digital assistants (PDAs) and cellular telephones, a user is often prompted to select an item from an ordered list, such as a contact or item from a list of contacts or purchase items (including groceries) in alphabetical order, or an event or date from a list of events or dates in temporal order. Usually, the user operates the hand-held device to cause the items on the list to scroll across a display screen of limited size until the item of interest appears on the screen. The user then additionally operates the hand-held device to select the displayed item. These user operations often require that the user's eyes be focused on the display screen until both operations are completed and that at least one of the user's hands be continually occupied to operate the hand-held device. This can be dangerous when the user is engaged in other actions, such as walking, exercising, driving or operating equipment.

SOME EXAMPLE EMBODIMENTS

Therefore, there is a need for an approach for quick selection of an item from an ordered list that does not require continuous hand and eye involvement. In various embodiments, techniques presented here allow an item to be selected quickly. For example, in some embodiments, an item can be selected in just three clicks from an ordered list of about 400 two-word items using a device with a small display with room for presenting just 9 icons for user selection.

According to one embodiment, a method comprises dividing all items in an ordered list of items into current groups. Each current group includes a different range of the items. The method also comprises causing to be presented substantively simultaneously, on one display screen, a corresponding plurality of icons for the plurality of current groups. One corresponding icon for each current group indicates a range of items included in the current group. The method further comprises, in response to receiving input that indicates a particular icon corresponding to a particular group of the plurality of current groups, dividing all items included in the particular group into a plurality of next current groups. Each next current group includes a different range of the items included in the particular group. The next current group are included in the current group and the step is repeated for causing to be presented substantively simultaneously, on the one display screen, a corresponding plurality of icons for the plurality of current groups.

According to another embodiment, an apparatus comprises at least one processor, and at least one memory including computer program code, the at least one memory and the computer program code configured to, with the at least one processor, cause, at least in part, the apparatus to divide all items in an ordered list of a plurality of items into a plurality of current groups, wherein each current group includes a different range of the items of the ordered list. The apparatus is also caused to cause a corresponding plurality of icons for the plurality of current groups to be presented substantively simultaneously on one display screen, wherein one corresponding icon for each current group indicates a range of items included in the current group. The apparatus is further caused to divide all items included in the particular group into a plurality of next current groups in response to receiving input that indicates a particular icon corresponding to a particular group of the plurality of current groups. Each next current group includes a different range of the items included in the particular group. The apparatus is further caused to again cause the corresponding plurality of icons for the plurality of current groups to be presented substantively simultaneously on one display screen wherein the plurality of current groups includes the plurality of next current groups.

According to another embodiment, a computer-readable storage medium carries one or more sequences of one or more instructions which, when executed by one or more processors, cause, at least in part, an apparatus to divide all items in an ordered list of a plurality of items into a plurality of current groups, wherein each current group includes a different range of the items of the ordered list. The apparatus is also caused to cause a corresponding plurality of icons for the plurality of current groups to be presented substantively simultaneously on one display screen, wherein one corresponding icon for each current group indicates a range of items included in the current group. The apparatus is further caused to divide all items included in a particular group into a plurality of next current groups in response to receiving input that indicates a particular icon corresponding to the particular group of the plurality of current groups. Each next current group includes a different range of the items included in the particular group. The apparatus is further caused to again cause the corresponding plurality of icons for the plurality of current groups to be presented substantively simultaneously on one display screen, wherein the plurality of current groups includes the plurality of next current groups.

According to another embodiment, an apparatus comprises means for dividing all items in an ordered list of items into current groups. Each current group includes a different range of the items. The apparatus also comprises means for presenting substantively simultaneously, on one display screen, a corresponding plurality of icons for the plurality of current groups. One corresponding icon for each current group indicates a range of items included in the current group. The apparatus also comprises means for dividing all items included in a particular group into a plurality of next current groups in response to receiving input that indicates a particular icon corresponding to the particular group of the plurality of current groups. Each next current group includes a different range of the items included in the particular group. The apparatus also comprises means for including the next current group in the current group and repeating the step for presenting substantively simultaneously, on the one display screen, a corresponding plurality of icons for the plurality of current groups.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for quick selection of an item from an ordered list are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term icon refers to a portion of a display area that presents visual content and represents data or a process that can be selected by a user using a keystroke or a pointing device, such as a mouse, thumbwheel, scrolling keys or touch screen, well known in the art. In some embodiments, other content is also presented when a user positions a pointing device over the icon, such as a pull-down menu of options, a pop up window with zero or more fields to be filled, audio content, tactile feedback, or other content, alone or in some combination.

Although various embodiments are described with respect to selecting a contact on a cellular telephone from an alphabetical list of contacts, it is contemplated that the approach described herein may be used with other ordered lists and devices, such as an alphabetical list of grocery items, a temporally ordered list of past or scheduled events, or a numerically ordered list of purchase prices or telephone numbers, among others, on a variety of devices including cell phones, PDAs, or laptop or desktop computers, among others.

Figure 1:
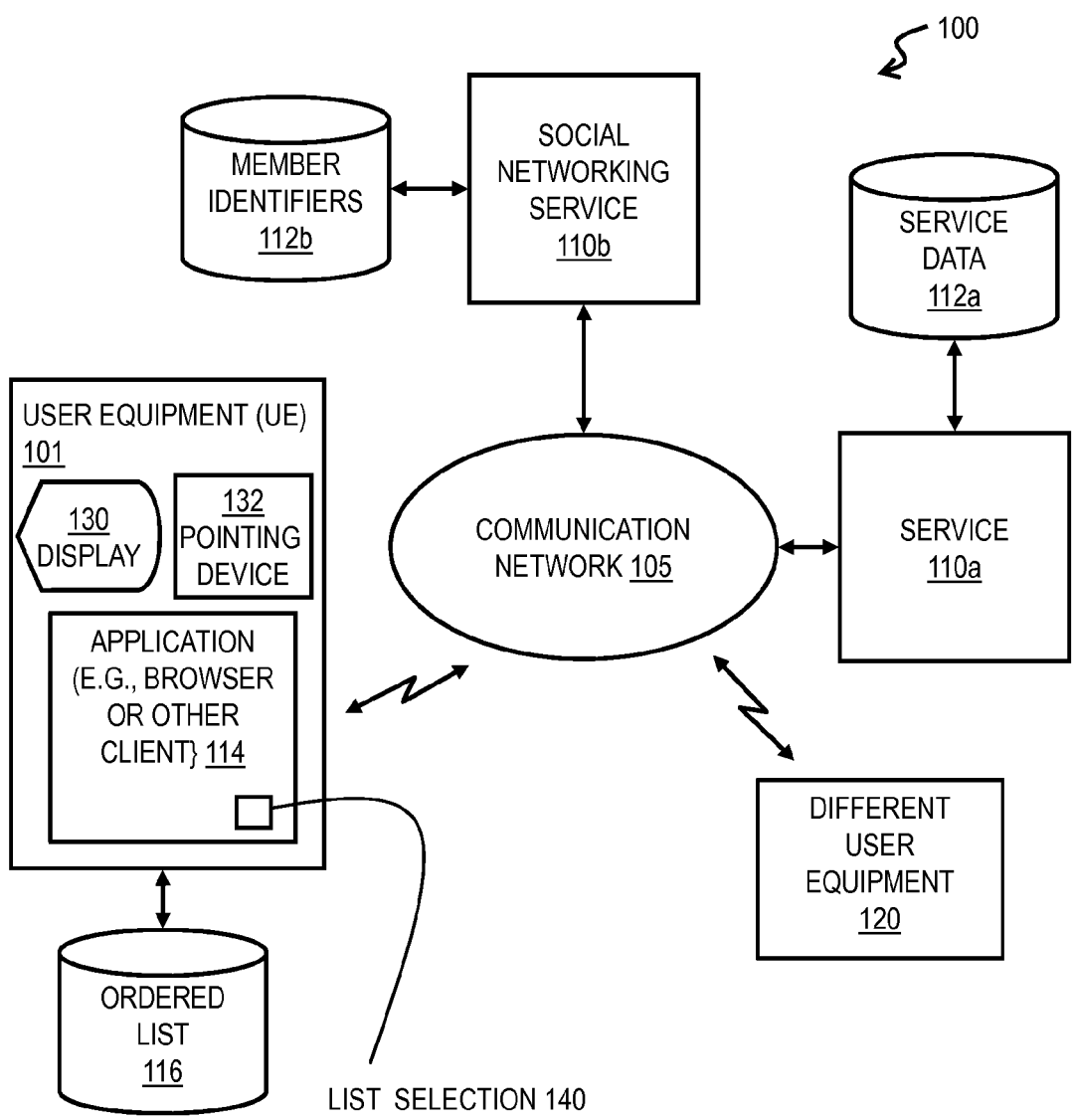
FIG. 1 is a diagram of a system capable of quick selection of an item from an ordered list, according to one embodiment.

FIG. 1 is a diagram of a system 100 capable of quick selection of an item from an ordered list, according to one embodiment. When a user of some device, called user equipment (UE) herein, wishes to select an item from an ordered list, the ordered list is presented to the user on a display screen of the user equipment from which an item is selected based on user input, e.g., by a keystroke or using a pointing device to indicate a portion of the display screen where the item is presented. When the display is large enough or the list is short enough to be presented simultaneously on a single screen, this approach is very efficient. However, when the list is long (e.g., a list of 300 contacts) or the screen is small (e.g., a display screen on a cellular telephone), or both, the selection of an item will require more time and effort. For example, a user is involved to watch a scrolling list of items until the desired item comes into view, and then to make the selection. Sometimes the user is given first the option of several icons with ranges of values corresponding to groups of items; and, after the user selects one group, the user is then presented with the scroll bar for selecting only items from that group. In either case, the user's hand is required to keep the list scrolling and indicate the final selection, while the user's eyes are involved to search for the item among the scrolling list. This involvement might exceed the user's patience or capacity, especially while the user is engaged in other important or dangerous activity, such as driving a car. Further the extra processing and extended display time further depletes scarce battery life on some mobile devices.

To address this problem, the system 100 of FIG. 1 introduces the capability to allow quick selection of an item by providing a very few static displays that the user can view without hands in a short glance, and which can be changed with a single keystroke or pointing device operation, e.g., click of a mouse or touch on a touch screen, involving a quick use of the user's hand or hands. The number of keystrokes or pointing device operations, and corresponding user glances, are kept near a minimum given the available display area of the screen on the user equipment. This approach is called quick selection of an item from an ordered list. For example, an item can be selected in just three clicks from an ordered list of about 400 two-word items using a device with a small display that presents just 9 icons for user selection. Such an approach has the advantage that only a few glances and a few clicks, separated in time as much as needed by a user to safely engage in another activity simultaneously, get the user to a desired item in the ordered list. The user does not lose his or her place by looking away or diverting hands to the other activity. The user does not need to type in the full contact name or even more than three keystrokes of the contact's name. This greatly reduces the effort by the user, allows more safe operation while the user is engaged in other activities, saves battery life and enhances the user experience.

As shown in FIG. 1, the system 100 comprises a user equipment (UE) 101 having connectivity to network service 110a or social networking service 110b (collectively referenced hereinafter as service 110) or user equipment of a different user (called different user equipment 120 herein) via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. In other embodiments, the UE 101 is stand alone, such as a PDA without wireless communication capability; and network 105, services 110 and different user equipment 120 are omitted.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE includes a display screen 130 and pointing device 132, as described in more detail below with reference to a computer system depicted in FIG. 5 and mobile terminal in FIG. 7.

An application process 114 that uses an ordered list stored in ordered list data structure 116 is executed on UE 101. For example, in some embodiments the application 114 is a personal information management (PIM) system that uses an ordered list of grocery items to buy, or a schedule of events for the coming months. In some embodiments, the application 114 is a client process communicating with a network service 110 across network 105, and the ordered list in data structure 116 is downloaded, entirely or in part, from the service 110. For example, the ordered list is downloaded form service data structure 112a of service 110 or member identifiers data structure 112b of social networking service 110b. In some embodiments, the service provides World Wide Web (WWW) pages in one or more messages sent using a Hypertext Transfer Protocol (HTTP) and the application 114 is a WWW client process called a browser. In some embodiments, the application is a telephone dialing process for connecting to other user equipment, such as different user equipment 120, and the ordered list is a list of other users, called a contact list, ordered numerically by telephone number or alphabetically by contact name or both.

In the illustrated embodiment, the application 114 includes a list selection module 140 that provides quick selection of an item from an ordered list by successively grouping items in selected groups and displaying the new groups as icons until a selection of an item is made or all remaining items can be displayed substantively simultaneously on the display of the user equipment. In some embodiments, the list selection module 140 is included in an operating system of the user equipment, e.g., UE 101. The application 114 sends the ordered list to the module 140 in the operating system using an application programming interface (API) for the module 140; and the module 140 controls the interaction with the user. Modules such as list selection module 140 are examples of means of achieving the advantages of quick selection of one or more items from an ordered list.

The components of list selection module 140 include one or more components for providing quick selection of an item from an ordered list. It is contemplated that one or more functions of this module may be separated or combined in one or more components or performed by one or more other components of equivalent functionality, e.g., in a network service 110.

Figure 2:
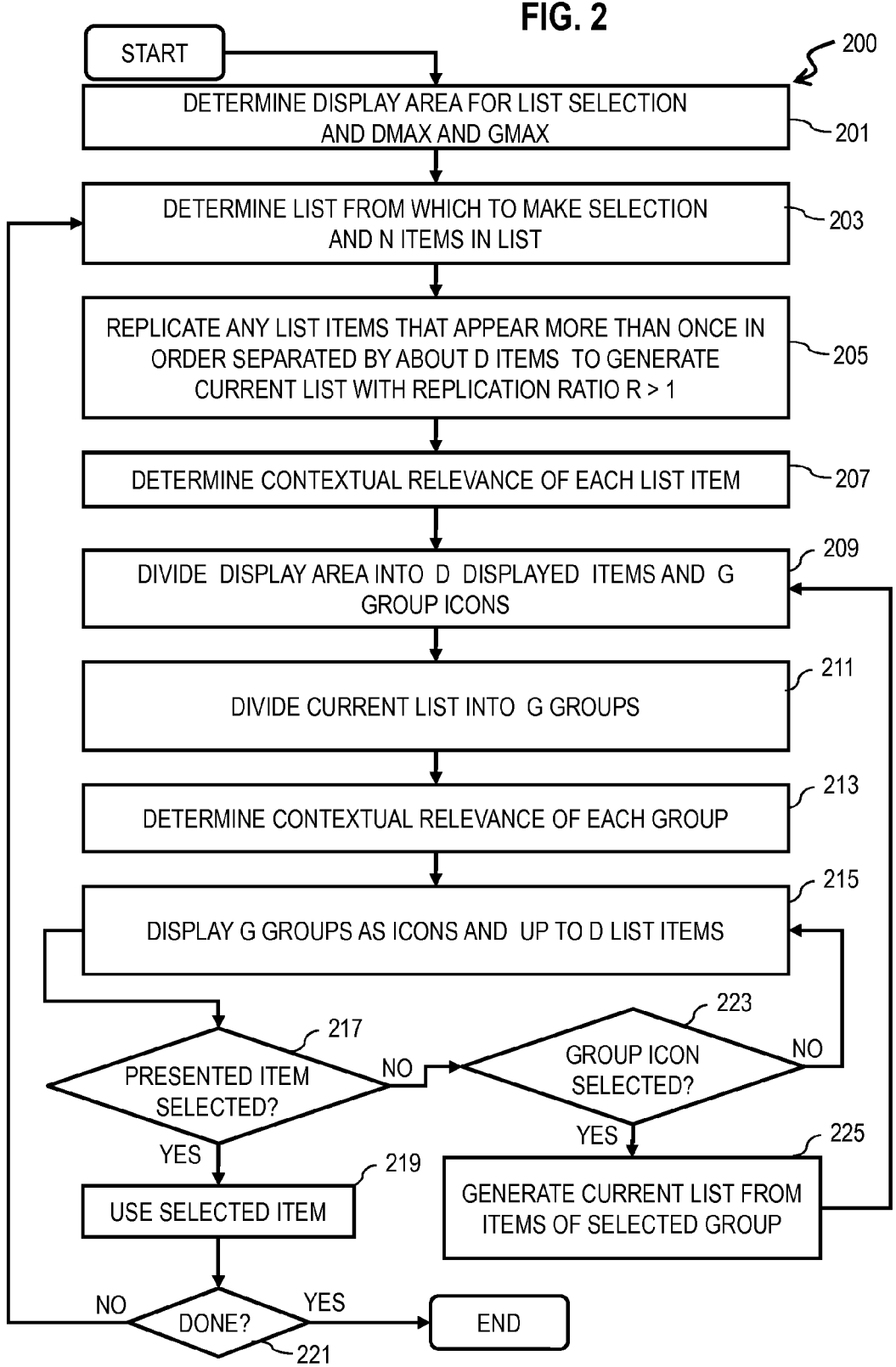
FIG. 2 is a flowchart of a process for quick selection of an item from an ordered list, according to one embodiment.

FIG. 2 is a flowchart of a process 200 for quick selection of an item from an ordered list, according to one embodiment. In one embodiment, the list selection module 140 performs the process 200 and is implemented in, for instance, a chip set including a processor and a memory as shown FIG. 6. Although steps are shown in FIG. 2 in a particular order for purposes of illustration, in other embodiments one or more steps, or portions thereof are performed in a different order or overlapping in time, performed in series or parallel, or one or more steps are omitted or one or more other steps are added, or the process is changed in some combination of ways.

In step 201, the area that is available for list selection on a display of the user equipment is determined. This value depends on the type and model of the user equipment and can be determined in any method known in the art. For example, in various embodiments, the data is included as a default value in software instructions, is received as manual input from a network service administrator on the local or a remote node, is retrieved from a local file or database, or is sent from a different node on the network, either in response to a query or unsolicited, or the data is received using some combination of these methods.

Figure 3A:
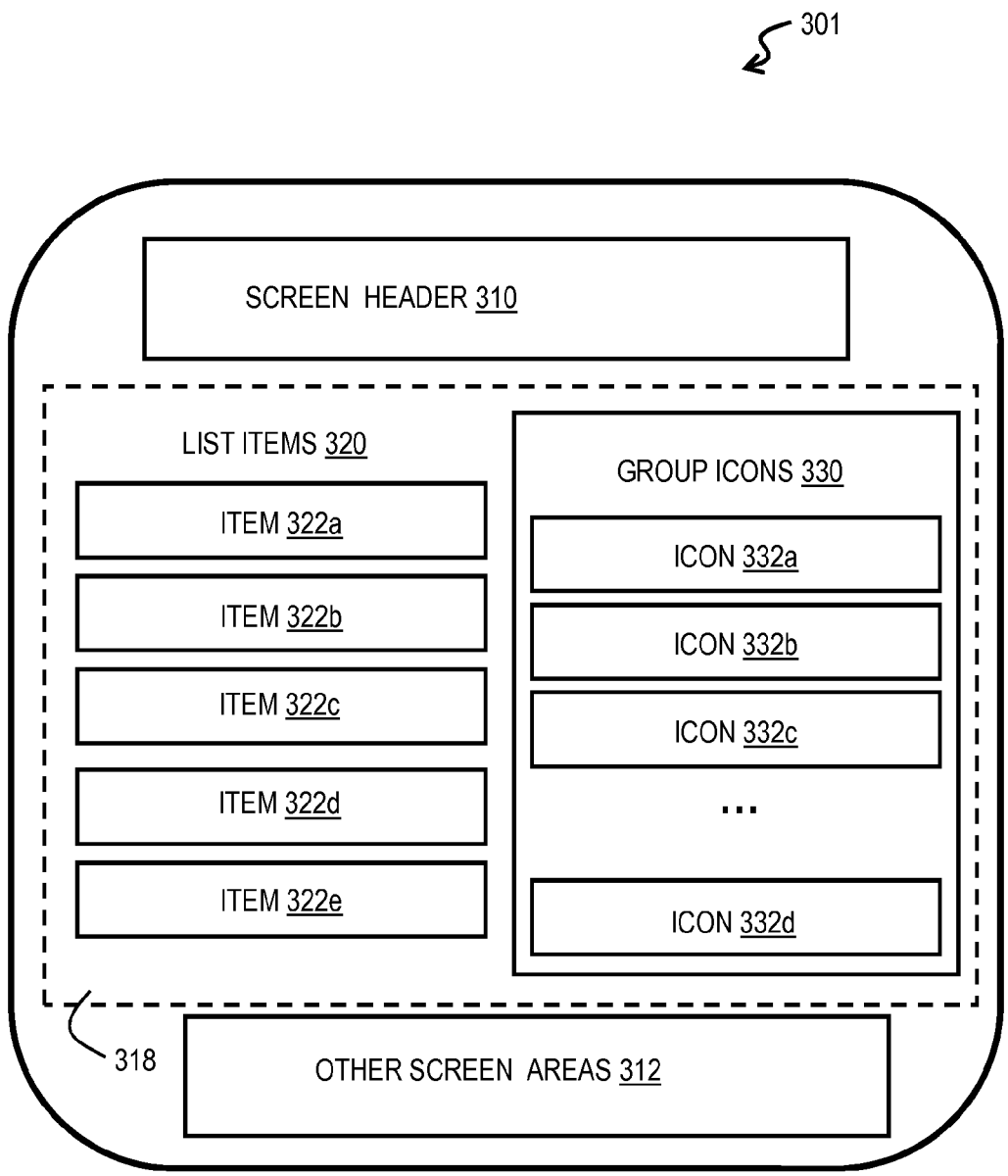
FIGS. 3A-3C and FIGS. 4A-4B are diagrams of user interfaces utilized in the processes of FIG. 2, according to various embodiments.

FIGS. 3A-3C and FIGS. 4A-4B are diagrams of user interfaces utilized in the processes of FIG. 2, according to various embodiments. FIG. 3A is a diagram that illustrates a GUI 301 on a display screen, such as display 130 on UE 101, according to one embodiment. The GUI 301 includes a screen header area 310 and other screen areas 312 and list selection area 318. The operating system of the device that includes display 130 usually reserves the screen header area 310 and populates it with visual content used to control the device; and allocates other areas 312 of the display screen to various applications executing on the device. In the illustrated embodiment, the operating system has allocated the list selection area 318, or allowed the list selection module 140 to claim the area 318. In the illustrated embodiment, the list selection area 318 includes a list items area 320 and a group icons area 330. The list items area 320 includes zero or more item areas, such as item area 322a through item area 322e, collectively referenced hereinafter as item areas 322. The group icons area 330 includes zero or more icons, such as icon 332a through icon 332d, among other indicated by ellipsis, collectively referenced hereinafter as group icons 332. For example, in some embodiments, an initially presented list selection area 318 includes no list items area 320 and only group icons area 330.

Returning to FIG. 2, in step 201, the size of list selection area 318 is determined. Also during step 201, the maximum number of items that can be displayed in the list item area 320, called DMAX hereinafter, is determined. Also during step 201, the maximum number of group icons that may be displayed in the group icon area 330, called GMAX hereinafter, is determined. Each group icon represents a group of items in a range of ordered values. As used herein a range refers to start and end values of the ordering parameter, e.g., a range of letters of the alphabet, a range of date-times, or a range of numerical values, which are used to order the items in the list. The items in the group constitute a range of items of the ordered list. Thus a range of items included in a group is indicated by the range of values of the ordering parameter. For example, a range of contact names is indicated by the alphabetic range A to Cl, which represents contacts with names starting with A through names starting with Cl. Thus a group icon for this range is an icon that indicates "A-Cl" in the icon's visual content. Up to GMAX group icons are displayed in group icons area 330 of list selection area 318.

In some embodiments, the group icons area 330 and list items area 320 are variable, one increasing and the other decreasing to fit inside list selection area 318. In some of these embodiments, the entire list selection area 318 may be used for group icons and GMAX is the number of group icons that can fit in the list selection area 318. Similarly, in some of these embodiments, the entire list selection area 318 may be used for list items and DMAX is the number of item areas that can fit in the list selection area 318. In some embodiments, the group icons are limited to a group icons area 330 that is only a portion of the list selection area 318.

The remaining list selection area 318 is allotted for list items area 320 to allow a sampling of items to be displayed in item areas 332 from one or more of the groups indicated in the group icons area 330.

In some embodiments, the maximum number (GMAX) of group icons presented on the display is fixed at a number that is easily navigated and selected in one glance and a quick move by the user's hand, such as six to twelve icons. In some embodiments, GMAX is input by a user, e.g., via a prompt in a user preferences menu, as is well known in the art. Thus, a limited number of group icons is an example of means to achieve the advantage of easy and quick navigation and selection. For purposes of illustration, it is assumed that during step 201 it is determined that GMAX is 5 and DMAX is 10, as depicted in FIG. 3A.

In step 203, an ordered list is determined from which a user is to make a selection, and the number N of items in the list is also determined. Any method may be used to determine the ordered list of N items, of which many are known in the art. For example, a pointer to the start of the ordered list in memory is passed to module 140 and the module 140 follows the list to the termination value to determine the number N. For purposes of illustration it is assumed that the list is a list of 300 contacts in alphabetical order.

In step 205, some items in the list are replicated. For example, contacts often have two names (e.g., Alice Smith) and a user might search for the contact using either name, especially when common first or last names make use of a single name ambiguous. The user may search under either first or last name, thus contacts are entered twice, once ordered by first name-last name, the second time ordered by last name-first name. The ordered list can easily double in size from N to 2N during replication for a replication ratio (R, defined as a final count divided by an initial count) of 2. Replication ratios R can be even greater in other lists, e.g., lists of grocery items with multiple word entries like "strawberry cheese cake, frozen." For the contacts list example, some items are single names, and some items have such similar first and last names (e.g., Barbara Barbarosa) that both items would appear close together in the ordered list (e.g., separated by less than DMAX, the number that would be displayed substantively simultaneously). Such items are not replicated in some embodiments, so that the replication ratio R is typically less than 2 for contacts lists. For example, when the same contact appears in the ordered list separated by DMAX/2 items or fewer, it is sure to be displayed in the same group and should not be replicated. In some embodiments, no replication is done, and step 205 is omitted.

In step 207 the contextual relevance of each item in the list is determined. Any method may be used to determine the contextual relevance. The context of the selection includes information about the user, the device, the current and recent applications executing on the device, the user input to the current and recent applications, the current or recent conditions of the network, the current or recent conditions of one or more services available through the network, the current time, the current or recent locations for the device, or current or recent communications between the user and other users of the network, or some combination. Each item of the list can be given a relevance metric depending on the amount of overlap of the item with the context of the selection. For example, a contact most recently communicating with the user or a contact with an address in a vicinity of the current position of the user is more relevant and has a higher relevance metric than a user with whom the user has not communicated recently or who does not live or report to be near the user's current location. In such embodiments, current context information is kept for the user equipment (e.g., UE 101) and this is attributed to the selection process. In some of these embodiments, additional information is associated with each item in the list, such as the address and most recently reported location or activity of each contact in a contact list, to further support the determination of a relevance metric. In some embodiments, a relevance metric determined by any relevance algorithm known in the art or publically available service is used to determine the relevance metric. In some embodiments, contextual relevance is not used, and step 207 is omitted.

In step 209 the display area is divided among D≤DMAX displayed items and G≤GMAX group icons, for example to minimize the number of clicks to select an item. Step 209 is repeated after any group icon is selected by a user. As each group icon is selected, the items in the indicated range of the selected group icon constitute a current ordered list; and the current ordered list is divided into up to GMAX groups. For example, when GMAX=9 and DMAX=8, the list selection area 318 is divided among nine group icons with the remaining area going to list six items of the DMAX=8 that could be displayed if the group icon area 330 is eliminated (which may be done for the last selected group). Thus a number GMAX of groups in the plurality of next current groups is equal to a number GMAX of groups in a prior plurality of current groups.

The larger the number of group icons, the faster the user can drill down to the final list. The number of pointing operations (mouse click or touch screen touch) or keystrokes, called clicks herein for convenience, to reach a list that is fully displayed in list selection area 318 can be determined using the following equations. Equation 1 shows the number of list items that can be selected with C clicks, where C is an integer.

$$N = DMAX * GMAX^{(C-1)}/R \qquad (1)$$

Thus with one click (C=1) a user can select one item from a list of DMAX/R (in which case there would need be no replication and R would equal 1.0). For R=1.5, DMAX=8 and GMAX=9, a user can select with two clicks one item from an initial list of 48; and with three clicks one item from an initial list of 432, a number larger than a typical contacts list. Similarly an item can be selected from an initial list up to 3,888 items with four clicks and up to 34,992 items with five clicks. The number of clicks for a list of a certain initial size N can be derived from the other parameters as given by Equation 2.

$$C = ROUNDUP(1 + \{\log(NR/DMAX)/\log(GMAX)\}) \qquad (2)$$

where ROUNDUP indicates an operation to raise a fraction to a next largest integer. For example, for a contacts list of 300 names and a replication factor of 1.5, with DMAX=8 and GMAX=9, one item can be selected in 3 clicks, much faster than scrolling through an ordered list of 300 items—or even through a list of 30 items, or typing four or more letters of the name of the desired contact. Thus a particular item is selected in response to receiving, no more than three times, input that indicates one icon of any current group, for ordered lists of up to about 3,888 items (a fourth click is used to select a particular item in the last presented group).

In some embodiments, use is made of any keys that are available on the user equipment, such as one or more soft keys that perform functions based on a software controlled label, a select key, a set of up-down-left-right keys, a number key pad, a familiar telephone keypad with 12 keys in four rows (1-2-3, 3-5-6, 7-8-9, *-0-#), or a full keyboard (e.g., a QWERTY keyboard). One group icon is associated with each key, at least on some screens, and the icon is selected by pressing the associated key. For example, if a user has a full keyboard and is selecting an item from an alphabetically ordered list, then each icon of at least a first set of group icons is labeled with a single letter that is selected by pressing the corresponding key on the keyboard, in some embodiments. Similarly the familiar telephone keypad of 12 keys associates three or more letters with each of nine keys; and each icon of at least a first set of group icons is labeled with three or more letters that are selected by pressing the corresponding key on the keypad, in some embodiments. In some of these embodiments, the group icons area need not even list all the groups but can simply display an icon labeled with text that says "Select letter using keys labeled with one or more letters" or equivalent. After the first selection is made by the user, one or more keys of the keyboard or keypad are displayed as multiple icons and reassigned a new range of letters or numbers or dates according to one of the methods described herein. In some embodiments, the keys are associated with group icons that are defined independently of the labels on the keys, for example as presented in table 1. Use of keys already on the user equipment is an example of means to extend the number of groups that can be presented, at least for the first click, and achieve an advantage of easily reducing the number of clicks used to drill down to a particular item.

TABLE 1

Example association of dynamic letter ranges with telephone keypad.

| KEY | RANGE LABEL |
|-----|-------------|
| 1 | Aa-Ax |
| 2 | Ba-Bu |
| 3 | By-Cu |
| 4 | Cy-Da |
| 5 | De-Di |
| 6 | Du-Do |
| 7 | El-Ey |
| 8 | Fa-Fe |
| 9 | Fi-Fo |
| * | Ga |
| 0 | Ge-Go |
| # | Gy-Gz |

In some embodiments, G is kept at GMAX; and each group represents DMAX items. However, in many of these embodiments, the number of items displayed D is less than DMAX until the last group is selected, to leave enough room for GMAX icons. When the last and smallest current group is selected, no further groups need be presented and the entire list selection area 318 is available to present DMAX items.

After one or more clicks, the remaining items in a current ordered list of the selected group may be less than or equal to DMAX*(GMAX-1). In some embodiments, the number of group icons is selected to be less than GMAX under such conditions. For example, in some embodiments, if there are n items in the current ordered list of the selected group, the number of groups is selected according to Expressions 3a and 3b and 3c.

IF $n \leq DMAX$, THEN $G=0$ (3a)

ELSE IF $n \leq DMAX*(GMAX-1)$, THEN
$G = ROUNDUP(n/DMAX)$ (3b)

ELSE $G = GMAX$ (3c)

The remaining area of list selection area 318 is then allotted to list item area 320. An advantage of this approach is to present more items in the list items area 320 and increase the chances that the item of interest to the user is displayed and can be selected after fewer clicks. In general, re-computation of a number of group icons according to expressions such as Expressions 3a and 3b is an example of a means to achieve this advantage.

Thus, a number of groups in the plurality of current groups is no more than GMAX, a maximum number of icons that are determined to be presented substantively simultaneously on the display screen. Expression 3b is utilized for determining whether all the items in the particular group divided by all the items that can be presented substantively simultaneously on the display screen is a derived number G that is less than GMAX, the maximum number of icons that may be presented substantively simultaneously on the display screen, wherein the derived number G is rounded up to a next integer. If the derived number G is less than the maximum number GMAX, then the plurality of next current groups consists of the derived number G of next current groups. Expression 3a is utilized for determining whether all the items in the particular group can be presented substantively simultaneously on the display screen before dividing all items in a particular group into a plurality of next current groups. If all the items in the particular group can be presented substantively simultaneously, then instead of dividing the items into a plurality of next current groups, all the items in the particular group are presented substantively simultaneously on the display screen.

Figure 3B:
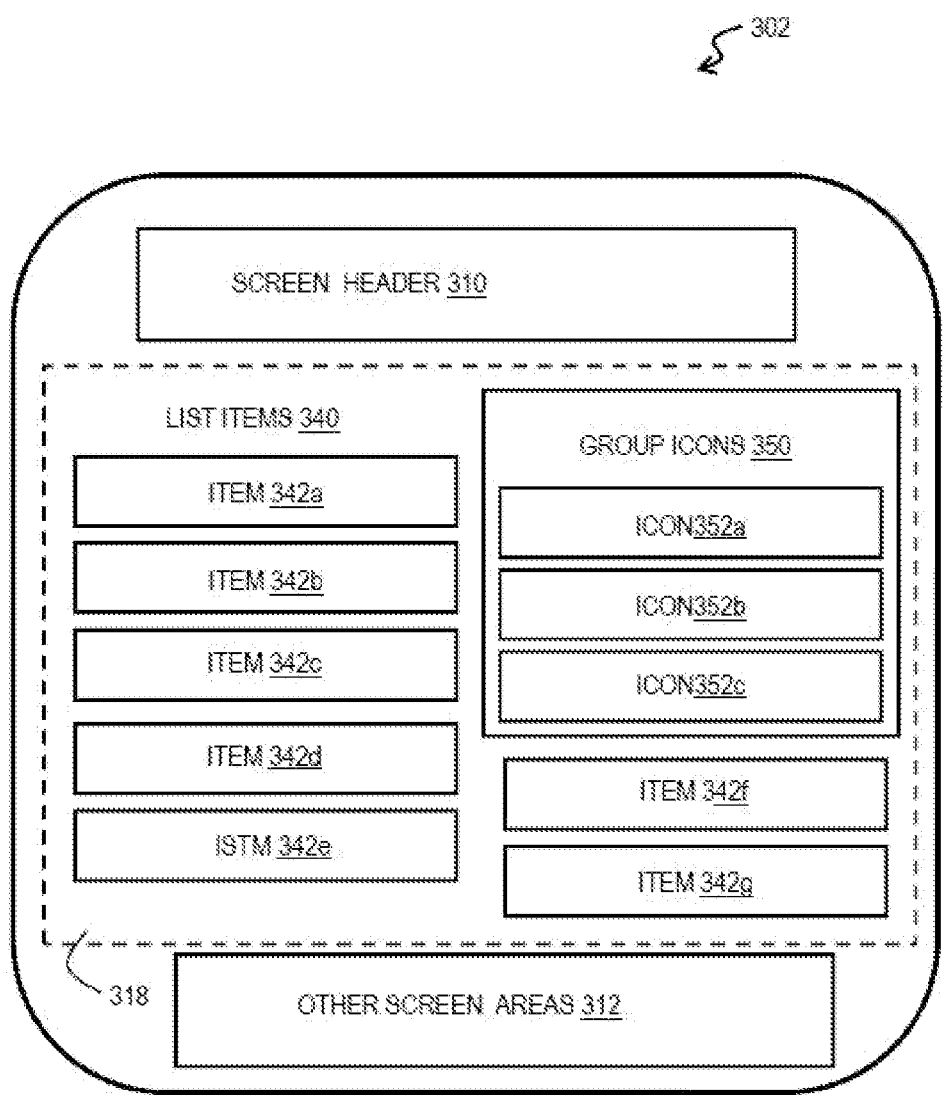

FIG. 3B is a diagram that illustrates a GUI 302 on a display screen, such as display 130 on UE 101, according to another embodiment. The GUI 302 includes the screen header area, other screen areas 312 and list selection area 318 as described above for GUI 301 in FIG. 3A. Here G=3 because n is more than 2*DMAX and less than or equal to 3*DMAX, as computed according to Expression 3b. Thus group icons area 350 is reduced in size to accommodate only three group icons 352a through 352c (collectively referenced hereinafter as group icons 352). The remaining area of list selection area 318 is allotted to list items area 340 in which seven items 342a to 342g are listed (collectively referenced hereinafter as item areas 342).

Figure 3C:
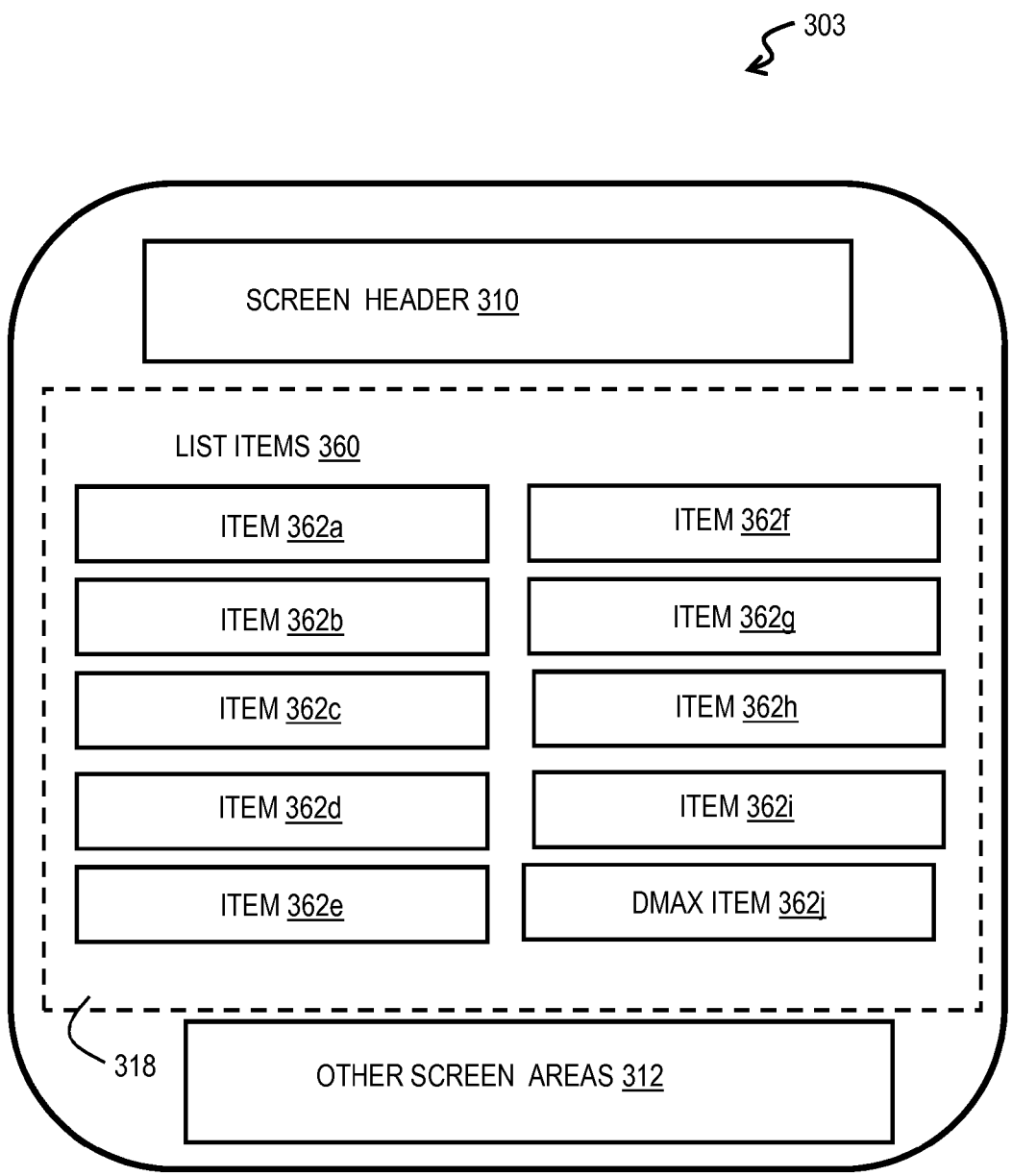

After one of the group icons 352 is selected, the ordered list corresponding to the selected group includes no more than DMAX items, as depicted in FIG. 3C. FIG. 3C is a diagram that illustrates a GUI 303 on a display screen, such as display 130 on UE 101, according to another embodiment. The GUI 303 includes the screen header area, other screen areas 312 and list selection area 318 as described above for GUI 301 in FIG. 3A. Here G=0 because n is no greater than DMAX, as computed according to Expression 3a. Thus group icons area 350 is eliminated. The remaining area of list selection area 318 is allotted to list items area 360 in which DMAX=10 item areas 362a to 362j are presented (collectively referenced hereinafter as item areas 362). The user's next click will select an item from the current ordered list, which is a subset of the initial ordered list.

In step 211 a current ordered list is divided into G groups (the number G selected above in step 209), for example, with simplified boundaries. When step 211 is first executed, the current ordered list is the initial ordered list received in step 203. After one or more selections of group icons are made by a user, as described below with reference to step 223 and step 225, the current ordered list is the range of items in the most recently selected group. Thus step 211 dynamically defines groups based on a current ordered list and the parameter G. Because the groups are defined dynamically at the time a selection is to be made, it does not matter whether a user has added or deleted items from the ordered list since a last selection. Using dynamically defined groups maximizes the number of items in a group and minimizes the levels of groups needed to reach a particular item in an ordered list, and thus quickens the selection of an item. Dynamically defined groups is thus an example means for achieving the advantage of quick selection of an item from an ordered list.

Thus, in step 211, all items in an ordered list of a plurality of items are divided into a plurality of current groups, wherein each current group includes a different range of the items of the ordered list. Similarly, in step 211, in response to receiving input that indicates a particular icon corresponding to a particular group of the plurality of current groups, all items included in the particular group are divided into a plurality of next current groups, wherein each next current group includes a different range of the items included in the particular group.

In some embodiments, simplified boundaries are not used in step 211 and the actual boundaries of the group are used. For example, if a range of items in a group ends after Barrison and the next group begins with Barrow, it is not very easy for a user to select between the two ranges A-Barri and Barro-D. It is more desirable to put Barrison and Barrow in the same group, e.g., the first group, and have simplified group ranges such as A-Ba, and Bb-D. Unless the number N is near the maximum number for a particular number C of clicks, the movement of a few items from one group to another should not increase the number C of clicks. Therefore in some embodiments, the range of items in a group is adjusted from completely even in order to simplify the group boundaries. In some of these embodiments, the range is adjusted without increasing the number of clicks to select a single item of the initial ordered list. Thus, in some embodiments, each different range for a group icon begins and ends on an order value presented as a limited number of characters less than about three.

In step 213, the contextual relevance of each group is determined. Any method may be used to determine the contextual relevance of the group. For example, in some embodiments, the relevance metric of each item in the group is added together to determine the relevance of each group. In some embodiments, group relevance is not used; and step 213 is omitted.

In step 215, G group icons and up to D items are presented substantively simultaneously on one display of the user equipment, e.g., on display 130 of UE 101. Each group icon represents one of the groups determined in step 211 of the current ordered list of items. For example, if in step 211, the current ordered list of items is divided into GMAX=5 groups, then five group icons 332 are presented in group icons area 330 of GUI 301. This leaves space for D=5 (less than DMAX=10) items to be listed in item areas 322 of list selection area 320. Each group icon 332 indicates a range of values of the parameter used to order the list, e.g., a range of alphabetical order letters for an alphabetical contacts list. Thus, a corresponding plurality of icons for the plurality of current groups is presented substantively simultaneously on one display screen. One corresponding icon for each current group indicates a range of items included in the current group. After one or more groups have been selected, step 215 amounts to repeating the presentation of current groups in which the plurality of current groups includes the plurality of next current groups. In some of these embodiments, the current groups include only the next current groups. In other embodiments one or more other groups are also included. For example, if the particular croup is represented by only three icons for the next current groups, one or more icons of the previous group may also be included in the current group, as a sort of backward step if the user has inadvertently selected the wrong icon. Thus if the next current groups are represented by three icons Ca-Db, Dc-Ef and Eg-Ga, the current group of icons include, in some embodiments, two more icons representing other ranges Ba-Bz and Gb-Jo (or even groups coalescing all items outside the selected group, A-Bz and Gb-Z) are included to allow the user to backtrack from a mistakenly chosen icon. Including icons for items outside the range of items in a particular selected group is an example of means to achieve the advantage of recovering from a mistaken selection of a group icon.

Similarly, if in step 211, the current ordered list of items is divided into G=3 groups (less than GMAX=5), then three group icons 332 are presented in group icons area 350 of GUI 302. This leaves space for D=7 (less than DMAX=10) items to be listed in item areas 342 of list items area 340. Similarly, if in step 211, the current ordered list of items fits in one group, G=0 and no group icons are presented. This leaves space for D=DMAX=10 items to be listed in item areas 362 of list items area 360.

Any method may be used to select the D items presented in the D item areas 322 or 342 in list items area 320 or 340, respectively. For example, in some embodiments, the first D items in the first group are presented in the item areas 322 or 342. Thus, a plurality of items included in the plurality of current groups is presented substantively simultaneously on the display screen with the corresponding plurality of icons for the plurality of current groups. It is desirable if the items presented in the list items area 322 or 342 happen to include the item the user will select; because presenting that item allows the user to complete the selection and avoids causing the user to continue to drill down to finer grained groups with one or more additional clicks. In some embodiments, a random selection of items from one or more randomly selected groups are presented to increase the chances that the presented items in list items area 320 or 340 include an item of interest that is not among the first D items of the first group. In some embodiments, the most relevant items of the most relevant group are presented in the item areas 322 or 342 of list items area 320 or 240, respectively. In some of these embodiments the most relevant group is indicated by highlighting the corresponding group icon. Thus, a plurality of most relevant items are presented, wherein relevance is determined based on at least one of a viewer of the display, a time of day, a day of the week, a current geolocation, a recent geolocation, a file recently accessed, an application recently executed, or a previous input received. In some embodiments, the most relevant items in the current ordered list are presented, regardless of group membership. In some of these embodiments, a group icon is not highlighted. In some embodiments, a group icon is highlighted that corresponds to a group that includes the first listed item, in item area 322a or 342a, such as the most relevant item.

Thus, an advantage of presenting one or more items in item areas 322 or 342 of list items area 320 or 340, respectively, is to bypass one or more clicks for the user to select an item in an ordered list. List item areas, such as list items area 320 or 340, are examples of means of achieving this advantage. A further advantage to increase the probability of presenting the desired item is obtained by selecting the D items at random from one or more groups for the current ordered list to allow items of interest other than the first few items of the first group to be presented; and, selecting the items at random from the current ordered list is an example of means to achieve that advantage. A still further advantage to increase the probability of presenting the desired item is obtained by selecting the D items based on a relevance metric; and, selecting the items based on a relevance metric from a current ordered list is an example of means to achieve that still further advantage.

In step 217, it is determined if a presented item is selected. For example, it is determined whether a mouse click, keystroke, or touch is executed over or indicating one of the item areas 322, 342, 362. If so, then in step 219, the selected item is used, e.g., to place a call or send a message from UE 101 to equipment 120 or from service 110 to equipment 120. In some embodiments, in step 219, the selected item is added to a group of items to be used together. Thus, in response to receiving input that indicates a particular item in the particular group, the particular item is selected and used.

In step 221, it is determined if the selection process is done. If so, then the process ends. Otherwise, control passes back to step 203 to determine the same or different list from which another item is to be selected.

If it is determined, in step 217, that a presented item area is not selected, then in step 223 it is determined whether a group icon is selected. If not, then control passes back to step 215 to display the same G groups and D items.

If it is determined in step 223 that a group icon is selected, then in step 225 a current ordered list is generated from the items of the selected group and control passes back to step 209 to determine the values of G and D to use for the GUI, and dynamically define new groups, as described above.

Figure 4A:
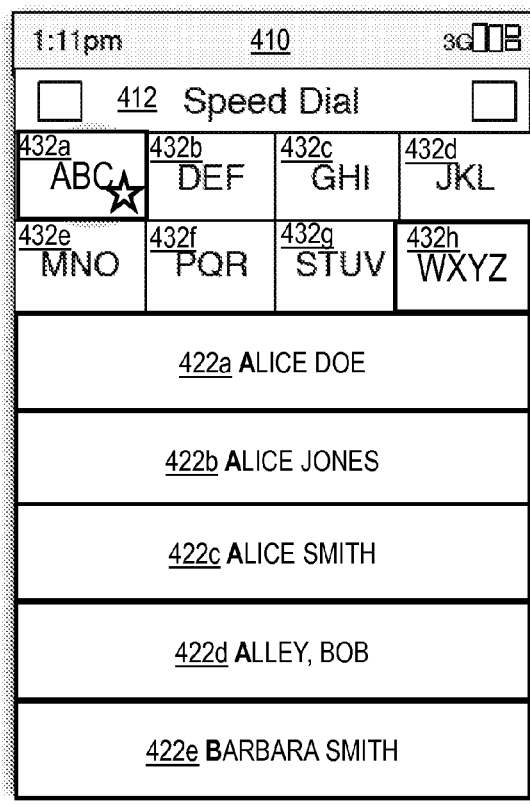

FIG. 4A is a diagram that illustrates a GUI 401 on a display screen, such as display 130 on UE 101, according to one embodiment in which the UE 101 is a cellular telephone. For purposes of illustration, it is assumed that, in this embodiment, GMAX=8 and DMAX=7. The GUI 401 includes a screen header area 410 and other screen areas 412 and list selection area filling the rest of the display screen. The operating system of the telephone reserves the screen header area 410 and populates it with visual content that gives a local time, a signal type (3G), the signal strength (two full bars), and the battery life (two bars). In the illustrated embodiment, the list selection area includes a list items area with five item areas, 422a through 422e, collectively referenced hereinafter as item areas 422. The list selection area includes a group icons area that includes eight group icons 432a through 432h, collectively referenced hereinafter as group icons 432. The group icons 432 span the entire alphabet from A to Z, with letters grouped to indicate simplified ranges of relatively evenly distributed contact names. The item areas 422 list the first five names in the first group. The group icon 432a which includes the presented items is highlighted as indicated in FIG. 4A by a star. It is further assumed for purposes of illustration that the number of items in each group is more than 7 and less than 15, i.e., 7<n<15. In some embodiments, a visual cue, such as highlighting, is provided to indicate why a particular name shows up in the list below. For example, in the illustrated embodiments, the letters of each name that cause that name to be in the highlighted group are made bold text.

Figure 4B:
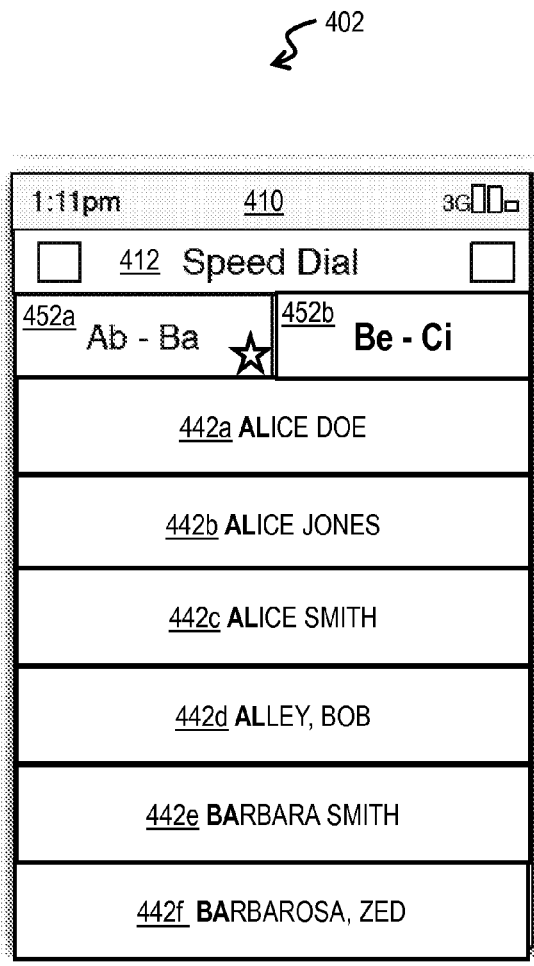

When a user selects a group icon, such as the highlighted group icon 432a, the range of items in the group are divided into G=2 groups because n lies between 7 and 15. FIG. 4B is a diagram that illustrates a GUI 402 on the display screen, such as display 130 on UE 101 after selecting the first group icon in GUI 401, according to an embodiment. The GUI 401 includes a screen header area 410 and other screen areas 412 and list selection area filling the rest of the display screen, as described above for GUI 401. In the illustrated embodiment, the list selection area includes a list items area with six item areas, 442a through 442e, collectively referenced hereinafter as item areas 442. The group icons area includes two group icons 452a and 452b, collectively referenced hereinafter as group icons 452. The group icons 452 span a small portion of the alphabet from Ab to Ce, with letters grouped to indicate simplified ranges of relatively evenly distributed contact names. The item areas 442 list the first six names in the first group. If the name to be selected is presented among the item areas 442, the user selects that item area, e.g., with a keystroke or pointing device, and is done. For example, if the user wishes to select Zed Barbarosa in item area 442f, then the user is able to select the item of interest in only two clicks (the first on group icon 432a and the second on item area 4420. If not presented, the user selects the group icon that indicates a range of letters that encompasses the item of interest. For example, the user selects group icon 452b to find a contact named Bob Smith. An item indicating Bob Smith is presented in an item area of the next GUI presented, and the user is able to select an item in just three clicks.

The processes described herein for providing quick selection of an item from an ordered list may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
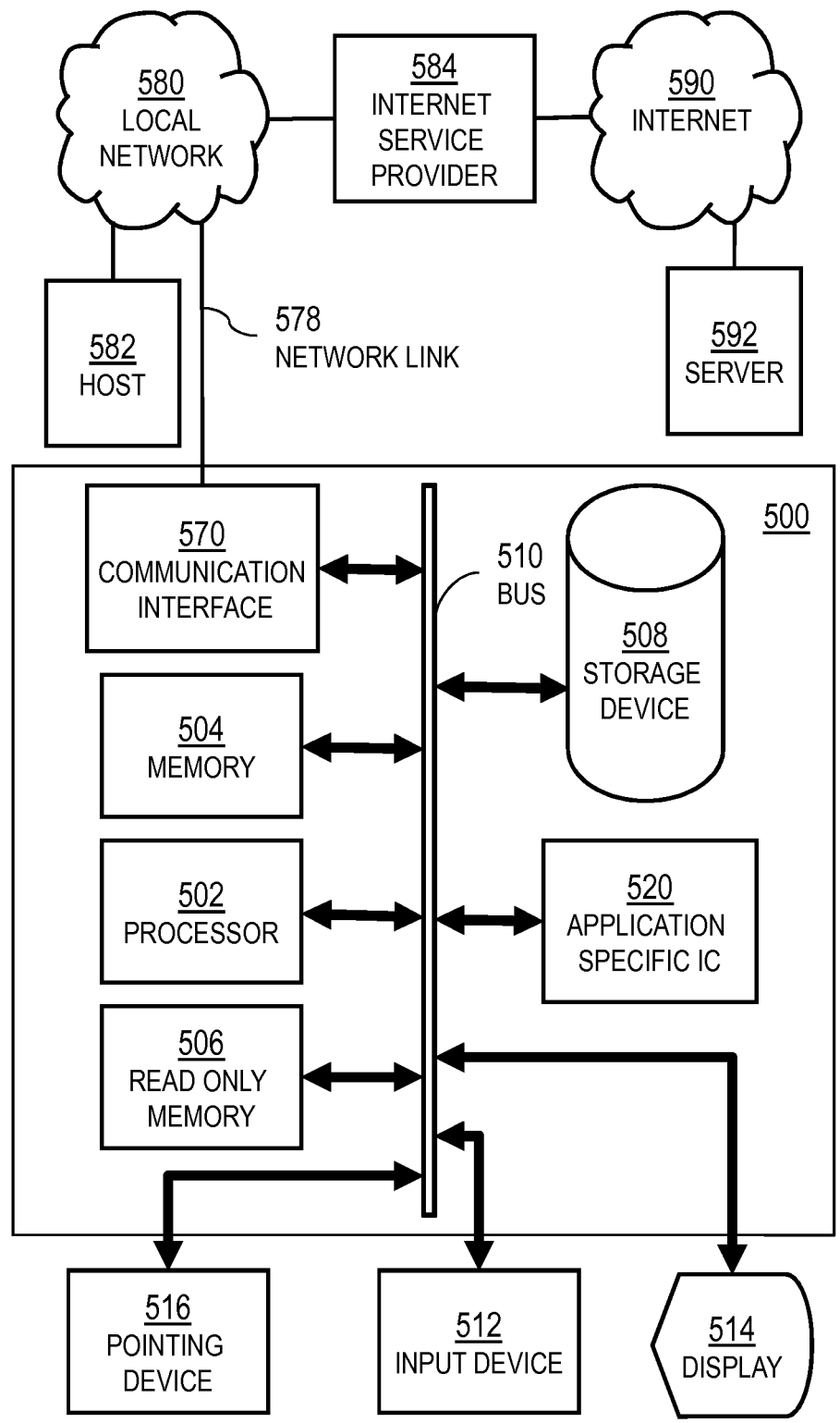
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide quick selection of an item from an ordered list as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing quick selection of an item from an ordered list.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to providing quick selection of an item from an ordered list. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for providing quick selection of an item from an ordered list. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing quick selection of an item from an ordered list is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing quick selection of an item from an ordered list to the UE 101.

The term "computer-readable medium" as used herein to refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
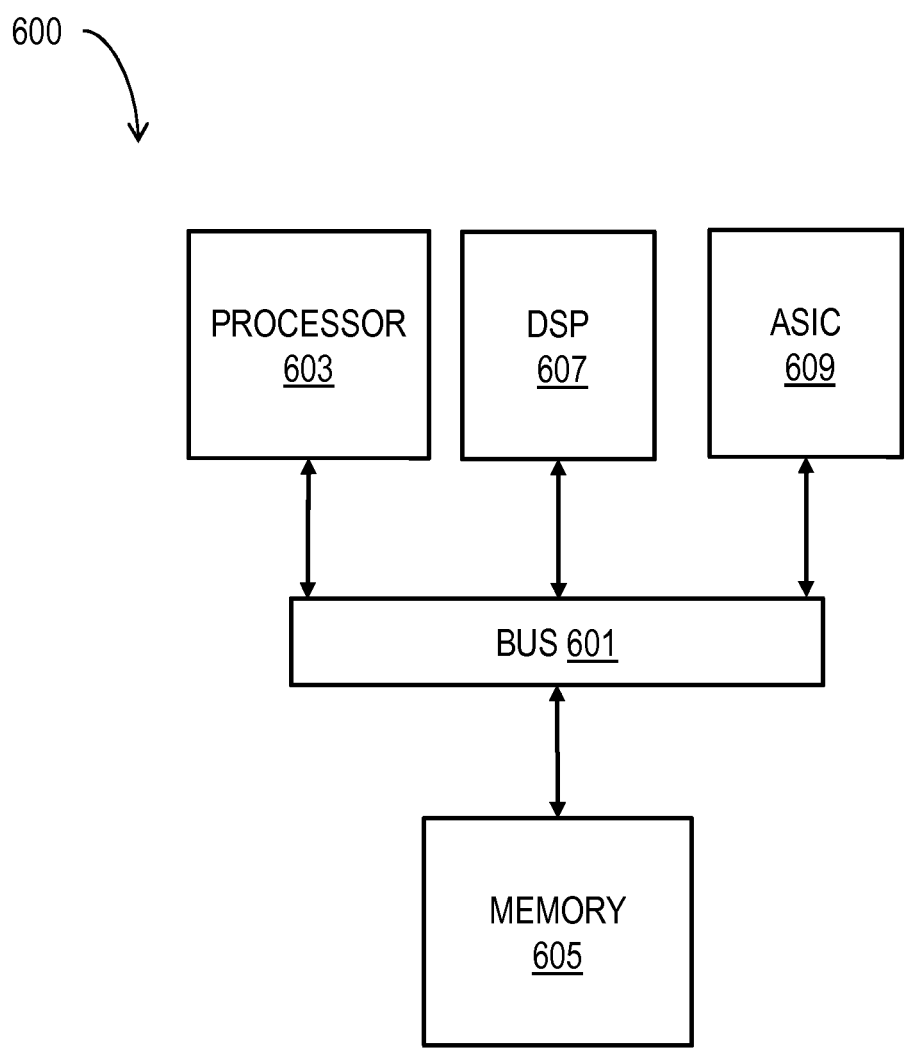
FIG. 6 is a diagram of a chip set that can be used to implement an embodiment of the invention.

FIG. 6 illustrates a chip set 600 upon which an embodiment of the invention may be implemented. Chip set 600 is programmed to provide quick selection of an item from an ordered list as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of providing quick selection of an item from an ordered list.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide quick selection of an item from an ordered list. The memory 605 also stores the data associated with or generated by the execution of the inventive steps.

Figure 7:
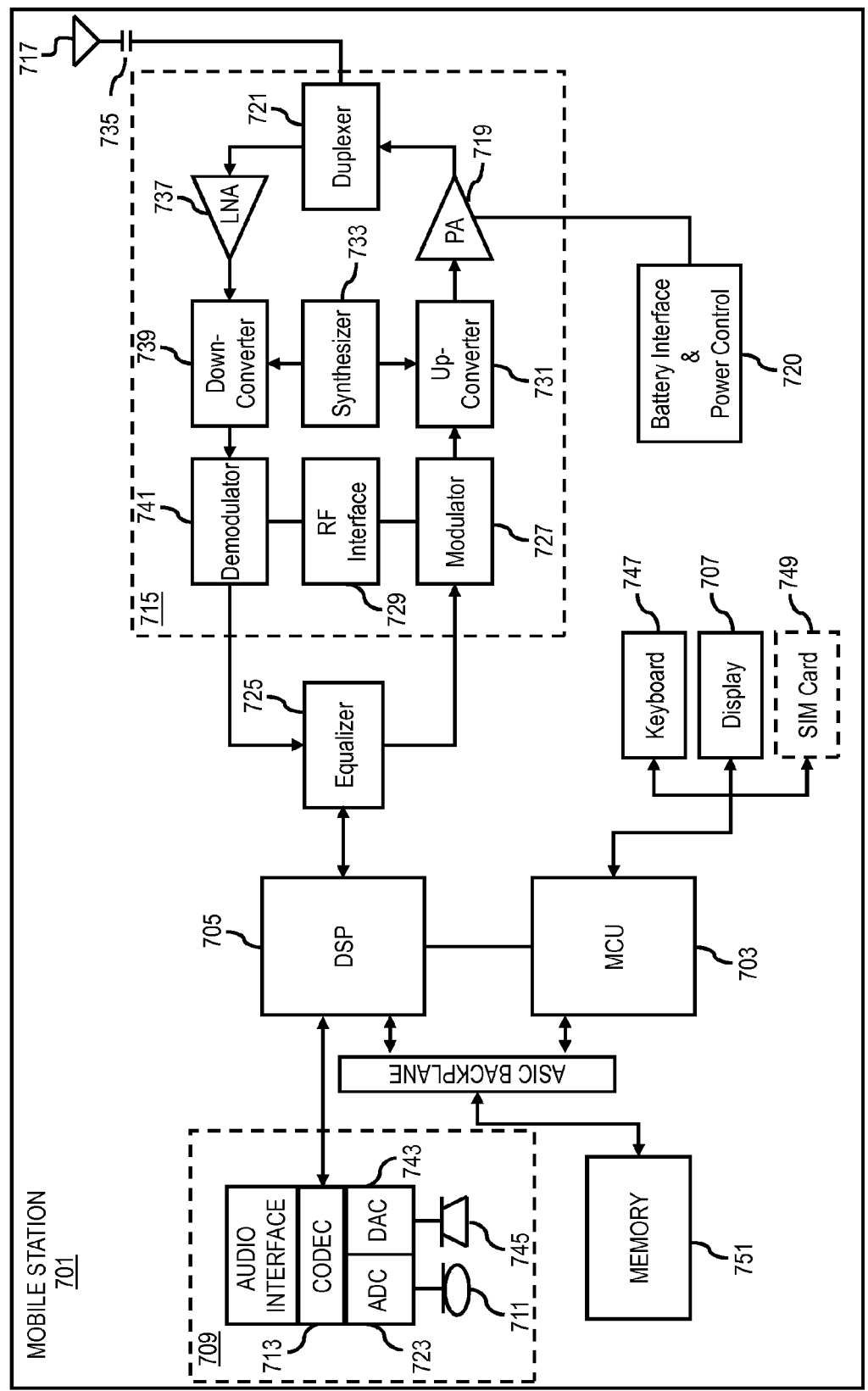
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of providing quick selection of an item from an ordered list. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing quick selection of an item from an ordered list. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to providing quick selection of an item from an ordered list. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    dividing all items in an ordered list of a plurality of items into a plurality of current groups, wherein each current group includes a different range of the items of the ordered list;
    causing presentation substantively simultaneously, on one display screen, of a corresponding plurality of icons for the plurality of current groups, wherein one corresponding icon for each current group indicates a range of items included in the current group;
    in response to receiving input that indicates a particular icon corresponding to a particular group of the plurality of current groups, dividing all items included in the particular group into a plurality of next current groups, wherein each next current group includes a different range of the items included in the particular group; and
    repeating the step of causing presentation substantively simultaneously, on one display screen, of a corresponding plurality of icons for the plurality of current groups, wherein the plurality of current groups includes the plurality of next current groups,
    wherein, when changing from displaying the current group to the next current group and displaying both group icons and items of the ordered list, an area of the display screen allocated to display the group icons and an area of the display screen allocated to display the items of the ordered list are not fixed in size; and
    wherein a number of groups in the plurality of current groups is no more than a maximum number of icons that is determined to be presented substantively simultaneously on the display screen.

2. A method of claim 1, wherein a number of groups in the plurality of next current groups is equal to a number of groups in a prior plurality of current groups.

3. A method of claim 1, further comprising causing presentation of, substantively simultaneously on the display screen with the corresponding plurality of icons for the plurality of current groups, a plurality of items included in the plurality of current groups.

4. A method of claim 3, wherein causing presentation of the plurality of items included in the plurality of current groups further comprises causing presentation of a plurality of most relevant items, wherein relevance is determined based on at least one of a viewer of the display, a time of day, a day of the week, a current geolocation, a recent geolocation, a file recently accessed, an application recently executed, or a previous input received.

5. A method of claim 3, further comprising, in response to receiving input that indicates a particular item of the plurality of items, selecting the particular item.

6. A method of claim 5, wherein the particular item is selected in response to receiving, no more than three times, input that indicates one icon of any current group.

7. A method of claim 1, further comprising repeating the step of dividing all items included in the particular group into a plurality of next current groups and the step of causing presentation substantively simultaneously, on one display screen, of a corresponding plurality of icons for the plurality of current groups, wherein the plurality of current groups includes the plurality of next current groups.

8. A method of claim 1, wherein each different range begins and ends on an order value presented as a limited number of characters less than three.

9. A method of claim 1, in response to receiving the input that indicates the particular icon corresponding to the particular group, the method further comprises:
    determining whether all the items in the particular group can be presented substantively simultaneously on the display screen before performing the step of dividing all items included in the particular group into a plurality of next current groups; and
    if all the items in the particular group can be presented substantively simultaneously, then instead of performing the step of dividing all items included in the particular group into a plurality of next current groups, causing presentation of substantively simultaneously, on the display screen, all the items in the particular group.

10. A method comprising:
    dividing all items in an ordered list of a plurality of items into a plurality of current groups, wherein each current group includes a different range of the items of the ordered list;
    causing presentation substantively simultaneously, on one display screen, of a corresponding plurality of icons for the plurality of current groups, wherein one corresponding icon for each current group indicates a range of items included in the current group;
    in response to receiving input that indicates a particular icon corresponding to a particular group of the plurality of current groups, dividing all items included in the particular group into a plurality of next current groups, wherein each next current group includes a different range of the items included in the particular group; and
    repeating the step of causing presentation substantively simultaneously, on one display screen, of a corresponding plurality of icons for the plurality of current groups, wherein the plurality of current groups includes the plurality of next current groups,
    wherein the step of dividing all items included in the particular group into a plurality of next current groups further comprises:
    determining whether all the items in the particular group divided by all the items that can be presented substantively simultaneously on the display screen is a derived number that is less than the maximum number of icons that is determined to be presented substantively simultaneously on the display screen, wherein the derived number is rounded up to a next integer; and if the derived number is less than the maximum number of icons, then determining that the plurality of next current groups consists of the derived number of next current groups.

11. An apparatus comprising:

at least one processor; and at least one memory including computer program code, the at least one memory and the computer program code configured to, with the at least one processor, cause the apparatus to perform at least the following, divide all items in an ordered list of a plurality of items into a plurality of current groups, wherein each current group includes a different range of the items of the ordered list;

cause a corresponding plurality of icons for the plurality of current groups to be presented substantively simultaneously on one display screen, wherein one corresponding icon for each current group indicates a range of items included in the current group;

in response to receiving input that indicates a particular icon corresponding to a particular group of the plurality of current groups, divide all items included in the particular group into a plurality of next current groups, wherein each next current group includes a different range of the items included in the particular group; and again cause the corresponding plurality of icons for the plurality of current groups to be presented substantively simultaneously on one display screen wherein the plurality of current groups includes the plurality of next current groups, wherein, when changing from displaying the current group to the next current group and displaying both group icons and items of the ordered list, an area of the display screen allocated to display the group icons and an area of the display screen allocated to display the items of the ordered list are not fixed in size; and wherein a number of groups in the plurality of current groups is no more than a maximum number of icons that is determined to be presented substantively simultaneously on the display screen.

12. An apparatus of claim 11, wherein the apparatus is further caused, at least in part, to cause a plurality of items included in the plurality of current groups to be presented substantively simultaneously on the display screen with the corresponding plurality of icons for the plurality of current groups.

13. An apparatus of claim 11, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

14. An apparatus of claim 11, wherein the apparatus is further caused, at least in part, in response to receiving the input that indicates the particular icon corresponding to the particular group to:

determine whether all the items in the particular group can be presented substantively simultaneously on the display screen before performing the step of dividing all items included in the particular group into a plurality of next current groups; and if all the items in the particular group can be presented simultaneously, then instead of performing the step of dividing all items included in the particular group into a plurality of next current groups cause all the items in the particular group to be presented substantively simultaneously on the display screen.

15. An apparatus comprising:

at least one processor; and at least one memory including computer program code, the at least one memory and the computer program code configured to, with the at least one processor, cause the apparatus to perform at least the following, divide all items in an ordered list of a plurality of items into a plurality of current groups, wherein each current group includes a different range of the items of the ordered list;

cause a corresponding plurality of icons for the plurality of current groups to be presented substantively simultaneously on one display screen, wherein one corresponding icon for each current group indicates a range of items included in the current group;

in response to receiving input that indicates a particular icon corresponding to a particular group of the plurality of current groups, divide all items included in the particular group into a plurality of next current groups, wherein each next current group includes a different range of the items included in the particular group; and again cause the corresponding plurality of icons for the plurality of current groups to be presented substantively simultaneously on one display screen wherein the plurality of current groups includes the plurality of next current groups, wherein to divide all items included in the particular group into a plurality of next current groups further comprises:

determine whether all the items in the particular group divided by all the items that can be presented substantively simultaneously on the display screen is a derived number that is less than the maximum number of icons that are determined to be presented substantively simultaneously on the display screen, wherein the derived number is rounded up to a next integer; and if the derived number is less than the maximum number of icons, then determine that the plurality of next current groups consists of the derived number of next current groups.

16. A non-transitory computer-readable storage medium carrying one or more sequences of one or more instructions which, when executed by one or more processors, cause an apparatus to at least perform the following steps:

dividing all items in an ordered list of a plurality of items into a plurality of current groups, wherein each current group includes a different range of the items of the ordered list;

causing presentation substantively simultaneously, on one display screen, of a corresponding plurality of icons for the plurality of current groups, wherein one corresponding icon for each current group indicates a range of items included in the current group;

in response to receiving input that indicates a particular icon corresponding to a particular group of the plurality of current groups, dividing all items included in the particular group into a plurality of next current groups, wherein each next current group includes a different range of the items included in the particular group; and repeating the step of causing presentation substantively simultaneously, on one display screen, of a corresponding plurality of icons for the plurality of current groups, wherein the plurality of current groups includes the plurality of next current groups, wherein, when changing from displaying the current group to the next current group and displaying both group icons and items of the ordered list, an area of the display screen allocated to display the group icons and an area of the display screen allocated to display the items of the ordered list are not fixed in size; and wherein a number of groups in the plurality of current groups is no more than a maximum number of icons that is determined to be presented substantively simultaneously on the display screen.

17. A non-transitory computer-readable storage medium of claim 16, wherein the apparatus is caused, at least in part, to further perform causing presentation of, substantively simultaneously on the display screen with the corresponding plurality of icons for the plurality of current groups, a plurality of items included in the plurality of current groups.

18. A computer-readable storage medium of claim 16, wherein the apparatus is caused, at least in part, in response to receiving the input that indicates the particular icon corresponding to the particular group, to further perform:
   determining whether all the items in the particular group can be presented substantively simultaneously on the display screen before performing the step of dividing all items included in the particular group into a plurality of next current groups; and
   if all the items in the particular group can be presented simultaneously, then instead of performing the step of dividing all items included in the particular group into a plurality of next current groups cause all the items in the particular group to be presented substantively simultaneously on the display screen.

* * * * *